United States Patent Office

2,771,396
Patented Nov. 20, 1956

2,771,396

PREPARATION OF DIAMINOPIMELIC ACID AND LYSINE

Lester Earl Casida, Jr., Baldwin, N. Y., assignor to Chas. Pfizer & Co., Inc., New York, N. Y., a corporation of Delaware No Drawing. Application December 9, 1955, Serial No. 551,987

11 Claims. (Cl. 195—30)

This invention is concerned with an improved method for the preparation of lysine which is an essential amino acid of commercial importance. In particular, it is concerned with a method for preparing lysine from the compound diaminopimelic acid and with the method for preparing diaminopimelic acid itself.

Although the work in this field was begun rather recently, because of the importance of lysine, there has been considerable work reported in the literature. Davis reported in Nature, volume 169, page 534 (1952), that certain lysine-requiring auxotrophs of Escherichia coli produce relatively large amounts of diaminopimelic acid. An enzyme that decarboxylates diaminopimelic acid to yield lysine has been reported to occur in many bacteria, (A Symposium on Amino Acid Metabolism, 1955, E. Work), but to be absent from E. coli auxotrophs that require lysine. (Dewey, Hoare and Work, Biochemical Journal, volume 58, page 523 (1954). See also Wright and Cresson, Proceedings of the Society for Experimental Biology and Medicine, volume 82, page 354 (1953).)

It has now been found that diaminopimelic acid may be produced in high yield and subsequently converted to lysine in high yield by the use of certain novel controlled conditions of the reactions. Thus, a method of preparing lysine, at a price substantially below that at which the compound is currently sold in commerce, has been developed.

The first step in this novel synthesis of lysine is the production of diaminopimelic acid. This is accomplished by means of an aerated deep tank, i. e. submerged, fermentation, using a mutant of E. Coli which is unable to decarboxylate diaminopimelic acid to lysine. Such mutants may be obtained by the penicillin method of Davis, (op. cit.) It has been found that several strains of E. coli which are not able to convert diaminopimelic acid to lysine and which require lysine for their growth, are useful for carrying out this reaction. In particular, one strain, selected from numerous other mutant strains, has been found to carry out this reaction in the best yield although the other strains of E. coli requiring lysine also work. A growing culture of this preferred E. coli strain which requires lysine for its growth and which carries out the production of diaminopimelic acid in high yield has been deposited with the American Type Culture Collection in Washington, D. C. and added to their permanent collection where it has been given the number ATCC 12,408. In order that this reaction producing diaminopimelic acid be carried out in high yield, conditions must be carefully controlled. It has been discovered that during the fermentation, the pH should be maintained near neutrality. During the fermentation, the pH tends to drop and neutrality is maintained by the addition of alkali, for example NaOH, KOH, and preferably ammonium hydroxide. Urea may also be used for this purpose, as it is converted to ammonia. Toward the end of the fermentation the pH tends to rise, and neutrality is held by adding sulfuric acid. It has also been discovered that the addition of glycerol to the medium is extremely helpful. It has been found that mannitol may be used in place of glycerol; however, glycerol has been found to be the most effective and economical. In addition, it has been found that cornsteep liquor is a particularly good constituent of the fermentation medium. This cornsteep liquor supplies the lysine required for the growth of the E. coli auxotrophs and also possibly acts as an economical source of precursors such as aspartic acid and lactic acid. Thus, by means of these three newly discovered controls of the fermentation, that is (1) the careful control of pH at or near neutrality, (2) the addition of glycerol in from 1 to 10% by volume, and (3) the use of cornsteep liquor, it has been found possible to produce diaminopimelic acid in economical large scale industrial quantities. Diaminopimelic acid is, of course, an extremely valuable compound. It is useful in itself and it is also useful as an intermediate for the synthesis of lysine, as will be shown below. We have also obtained some evidence to show that diaminopimelic acid may be used as a supplement in the feeding of poultry where it may take the place of lysine.

This fermentation is conducted at about 28° C. and in general approximately three days are required to obtain optimum yield. It is, of course, understood that conditions for obtaining the best yield vary somewhat with the particular strain of organism employed.

The final step in the synthesis of lysine is the conversion of the diaminopimelic acid to lysine. This is accomplished by treatment of the diaminopimelic acid, preferably in the original broth containing the cells, with the enzyme diaminopimelic acid decarboxylase obtained from organisms of the species Aerobacter aerogenes and also from ordinary members of the species E. coli, that is, members of the species E. coli which do not require lysine for their growth. The enzyme is liberated from the cells of these organisms by any of the standard methods used to liberate enzymes. These include treatment with a solvent such as butanol, treatment with ultrasonic energy, and the preparation of acetone-dried powder. We have found that the preferred method for liberating the enzyme diaminopimelic acid decarboxylase from organisms of the genus A. aerogenes and organisms of the genus E. coli which do not require lysine for their growth, is treatment with the solvent toluene, which has the additional advantage of maintaining sterility during the latter stages of the reaction in which the enzyme is used. The cells may be treated with toluene either before or after the addition to the original diaminopimelic acid broth, but in either case it is preferred that the toluene be present in the conversion mixture and not separated off. One particular strain of A. aerogenes, which gives very high yields because it lacks the enzyme lysine decarboxylase, has been deposited with the ATCC and given the number 12,409.

For maximum conversion of the diaminopimelic acid to lysine, it is desirable that certain conditions be used. It has been discovered that the addition of chelating agents such as citrate ions and ethylenediaminetetraacetic acid tetrasodium salt is very helpful to carrying out this reaction. The addition of vitamin B6 is helpful also. The chelating agent and the B6 are especially helpful when high concentrations of diaminopimelic acid are being reacted. It has also been discovered that carrying out this reaction in the absence of light also increases the yield, but is not essential.

This conversion of diaminopimelic acid to lysine is carried out in approximately 24 hours. A temperature of approximately 28° C. has been found to give good results.

Following this reaction, the lysine is then purified by filtration of the enzyme reaction mixture, absorption of the lysine on a strong cation exchange resin, such as the sulfonic acid resin Amberlite IR–120 (TM of Rohm and Haas Co.), elution of the lysine from the cation exchange resins by dilute alkali, such as potassium hydroxide or sodium hydroxide, passage of this eluate through a weak cation exchange resin, such as the carboxylic resin Amberlite IRC–50 (TM of Rohm and Haas Co.), which will not absorb the lysine, and drying of the effluent. Additional purification is then carried out by standard method of recrystallization.

The following examples are given solely for the purpose of illustration and are not to be construed as limitations of this invention, many variations of which are possible without departing from the spirit or scope thereof.

EXAMPLE I

*Production of diaminopimelic acid*

E. coli, ATCC 12,408, was grown for 20 hours at 28° C. with shaking on the following medium which had previously been sterilized by autoclaving for 30 minutes at 20 pounds/square inch pressure:

| | | |
|---|---|---|
| $(NH_4)_2HPO_4$ | percent | 0.5 |
| Cornsteep liquor | do | 0.5 |
| Glycerol | do | 0.5 | pH adjusted to 7.5 with potassium hydroxide

Another medium was prepared for actual preparation of the diaminopimelic acid. This medium had the following composition:

| | | |
|---|---|---|
| $(NH_4)_2HPO_4$ | percent | 4 |
| Cornsteep liquor | percent by volume | 4 |
| Glycerol | do | 6 |
| $CaCO_3$ | percent | 0.5 | pH adjusted to 7.5 with potassium hydroxide

Two liters of this medium were autoclaved for one hour at 20 pounds/square inch pressure.

100 cc. of the original inoculum was added to 2 l. of the production medium. The reaction was carried out at 28° C. with stirring at the rate of 1750 revolutions/minute and aeration at the rate of one volume of air/volume of reaction mixture/minute. A trace of soy bean oil was added as an antifoam agent. After 72 hours, the mixture assayed as having a diaminopimelic acid content of 9.0 mg./ml.

EXAMPLE II

*Alternate production of diaminopimelic acid*

E. coli, ATCC Number 12,408, was grown on the nutrient medium described in Example I to obtain an inoculum. One liter of this inoculum was added to 25 gallons of the following sterilized production medium:

| | | |
|---|---|---|
| $(NH_4)_2HPO_4$ | percent | 2 |
| Cornsteep liquor | percent by volume | 4 |
| Glycerol | do | 7 |
| $CaCO_3$ | percent | 0.5 | pH adjusted to 7.5 with potassium hydroxide

The reaction was carried out at 28° C. with stirring at the rate of 1750 revolutions/minute and aeration at the rate of one volume of air/volume of reaction mixture/minute. A trace of Dow Corning Antifoam A (brand of silicon defoamer) was added as an anti-foam agent. During the reaction, the pH was maintained near neutrality by adding ammonium hydroxide gradually, beginning at the end of approximately 24 hours of reaction time. The pH tends to drop and it is preferred to add ammonium hydroxide gradually so as to keep the pH very slightly (between 7 and about 7.5) above neutrality and thereby prevent the development of a low pH. After the reaction had proceeded for 64 hours, it was necessary to add sulfuric acid in order to maintain neutrality, since at this stage of the reaction the pH tended to rise. After 68 hours, the reaction mixture was assayed as having a diaminopimelic acid content of 6.5 mg./ml.

EXAMPLE III

*Conversion of diaminopimelic acid to lysine*

One hundred ml. of a broth in which diaminopimelic acid had been produced in a manner similar to that described in Example I above and assaying at 2.5 mg. of diaminopimelic acid/ml. was adjusted to a pH of 7.2. It should be noted that the cells of E. coli used to produce the diaminopimelic acid were not removed from this broth but were allowed to remain in it. This broth was contained in a 300 cc. Erlenmeyer flask and 5 cc. of toluene were added.

A. aerogenes, ATCC Number 12,409, was grown for 20 hours in two liter batches of the following medium:

| | | |
|---|---|---|
| Glycerol | percent | 0.5 |
| $(NH_4)_2HPO_4$ | do | 0.5 |
| Cornsteep liquor | do | 0.5 | pH adjusted to 7.5 by potassium hydroxide

The conditions for growth were a temperature of 28° C., agitation at the rate of 1750 revolutions/minute, aeration at the rate of one volume of air/volume of mixture/minute, with a trace of soy bean oil added as an anti-foam agent. After 20 hours, 25 cc. of the broth containing suspended cells were centrifuged and the supernatant liquid discarded. These cells were then added to the Erlenmeyer flask containing the diaminopimelic acid broth and toluene. This flask was then shaken for 16 hours at 28° C. at the end of which time the diaminopimelic acid was converted to lysine in 100% yield. The lysine was recovered by ion exchange treatment.

EXAMPLE IV

*Alternate method of converting diaminopimelic acid to lysine*

100 cc. of diaminopimelic acid broth was added to a 300 cc. Erlenmeyer. The pH was adjusted to 7.2 and 5 cc. of toluene were added.

A. aerogenes, ATCC Number 12,409, was grown as in Example III and at the end of 20 hours, 7 ml. of the cell broth suspension was centrifuged and the supernatant discarded. The cells were freeze-dried to yield 75 mg. of solids which was added to the above Erlenmeyer flask containing diaminopimelic acid broth and toluene. This Erlenmeyer flask was shaken for 16 hours at 28° C. following which time the diaminopimelic acid was found to be converted to lysine in 100% yield.

EXAMPLE V

*Use of chelating compounds*

In other experiments concerning the conversion of diaminopimelic acid to lysine conducted in a manner similar to that described in Examples III and IV above, it was found that in cases where the diaminopimelic acid containing broth contained a high concentration of this acid, the conversion to lysine could be made to take place more completely and more rapidly than would otherwise be the case with broths containing these high concentrations by adding a chelating agent to the mixture. Citric acid and ethylenediaminetetraacetic acid tetrasodium salt were found helpful when added in concentrations of from about 0.004 molar to about 0.032 molar. Use of higher concentrations is not recommended.

The addition of vitamin B6 during the conversion of diaminopimelic acid to lysine is also helpful in carrying out the reacton. Only trace amounts of the vitamin are required.

What is claimed is:

1. A process for the preparation of lysine which comprises the steps: (a) fermenting on a nutrient medium comprising glycerol and cornsteep liquor under submerged, aerobic conditions with a mutant of *E. coli* which requires lysine for its growth and lacks the enzyme diaminopimelic acid decarboxylase, while maintaining the pH of the medium near neutrality, and (*b*) treating diaminopimelic acid with the enzymes produced by an organism selected from the group consisting of *A. aerogenes*, and those strains of *E. coli* which do not require lysine for their growth.

2. A process for the preparation of diaminopimelic acid which comprises fermenting on a nutrient medium comprising glycerol and cornsteep liquor under submerged, aerobic conditions with a mutant of *E. coli* which requires lysine for its growth and lacks the enzyme diaminopimelic acid decarboxylase, while maintaining the pH of the medium near neutrality.

3. A process for the preparation of lysine which comprises treating diaminopimelic acid with the enzymes produced by an organism selected from the group consisting of *A. aerogenes* and those strains of *E. coli* which do not require lysine for their growth.

4. In a process for the preparation of diaminopimelic acid by a submerged, aerobic fermentation with a mutant of *E. coli* which requires lysine for its growth and lacks the enzyme diaminopimelic acid decarboxylase, the improvement of maintaining the pH of the medium near neutrality.

5. In a process for the preparation of diaminopimelic acid by a submerged, aerobic fermentation with a mutant of *E. coli* which requires lysine for its growth and lacks the enzyme diaminopimelic acid decarboxylase, the improvement of adding glycerol to the nutrient medium.

6. In a process for the preparation of diaminopimelic acid by a submerged, aerobic fermentation with a mutant of *E. coli* which requires lysine for its growth and lacks the enzyme diaminopimelic acid decarboxylase, the improvement of adding cornsteep liquor to the nutrient medium.

7. In a process for the preparation of lysine by the treatment of diaminopimelic acid with the enzymes produced by an organism selected from the group consisting of *A. aerogenes* and those strains of *E. coli* which do not require lysine for their growth, the improvement of adding a chelating agent to the reaction mixture.

8. A process as in claim 7 wherein the chelating agent is the citrate ion.

9. A process as claimed in claim 7 wherein the chelating agent is ethylenediaminetetraacetate tetrasodium salt.

10. A process as claimed in claim 2 wherein the organism employed is *E. coli* ATCC 12,408.

11. A process as claimed in claim 3 wherein the organism employed is *A. aerogenes* ATCC 12,409.

References Cited in the file of this patent

Advances in Enzymology, vol. 16, 1955, pages 297–299.